US012121483B2

(12) United States Patent
Shang et al.

(10) Patent No.: US 12,121,483 B2
(45) Date of Patent: Oct. 22, 2024

(54) MEDICAL BED HORIZONTAL DRIVING MECHANISM AND MEDICAL BED HORIZONTAL DRIVING SYSTEM, AND MEDICAL BED

(71) Applicant: Siemens Shanghai Medical Equipment Ltd., Shanghai (CN)

(72) Inventors: Hong Shang, Shanghai (CN); Shi Kun Qian, Jiangsu (CN)

(73) Assignee: Siemens Shanghai Medical Equipment Ltd., Shanghai (CN)

( * ) Notice: Subject to any disclaimer, the term of this patent is extended or adjusted under 35 U.S.C. 154(b) by 204 days.

(21) Appl. No.: 17/905,832

(22) PCT Filed: Mar. 13, 2020

(86) PCT No.: PCT/CN2020/079247
§ 371 (c)(1),
(2) Date: Sep. 8, 2022

(87) PCT Pub. No.: WO2021/179294
PCT Pub. Date: Sep. 16, 2021

(65) Prior Publication Data

US 2023/0117415 A1 Apr. 20, 2023

(51) Int. Cl.
*A61G 7/018* (2006.01)
*A61G 7/05* (2006.01)
*A61G 7/10* (2006.01)

(52) U.S. Cl.
CPC ........... *A61G 7/018* (2013.01); *A61G 7/0507* (2013.01); *A61G 7/1025* (2013.01); *A61G 2203/30* (2013.01)

(58) Field of Classification Search
USPC ........................................................ 5/81.1 C
See application file for complete search history.

(56) References Cited

U.S. PATENT DOCUMENTS 8,713,730 B2 * 5/2014 Koh ........................ A61G 1/003 5/81.1 R
2011/0073442 A1 * 3/2011 Rau ...................... B65G 17/345 198/779

(Continued)

FOREIGN PATENT DOCUMENTS

CN 102066215 A 5/2011
CN 107361927 A 11/2017

(Continued)

OTHER PUBLICATIONS

PCT International Search Report—App. PCT/CN2020/079247, dated Dec. 10, 2020.

*Primary Examiner* — Adam C Ortiz
(74) *Attorney, Agent, or Firm* — Banner & Witcoff Ltd.

(57) ABSTRACT

A medical bed horizontal driving mechanism includes a bracket, a drum, an electric motor, and a position sensor. The bracket is configured to be fixedly connected to a bed frame of a medical bed. The drum is rotatably connected to the bracket. The drum is rotatable to drive a bed board of the medical bed to move relative to the bed frame. The electric motor is arranged in a cavity of the drum. A housing of the electric motor is fixedly connected to the bracket. An output shaft of the electric motor is connected to the drum to drive the drum to rotate relative to the bracket. The position sensor is arranged in the cavity of the drum. The position sensor can detect a rotational position of the drum and generate a position signal, which is used to control the electric motor.

12 Claims, 4 Drawing Sheets

(56) References Cited

U.S. PATENT DOCUMENTS

| | | | | |
|---|---|---|---|---|
| 2012/0084914 | A1* | 4/2012 | Patterson | A61G 7/1046 5/81.1 C |
| 2014/0123384 | A1* | 5/2014 | White | A61G 7/1032 156/60 |
| 2015/0107024 | A1 | 4/2015 | Xu | |

FOREIGN PATENT DOCUMENTS

| | | | |
|---|---|---|---|
| CN | 207356189 | U | 5/2018 |
| CN | 108272570 | A | 7/2018 |
| CN | 208355658 | U | 1/2019 |
| CN | 209048502 | U | 7/2019 |
| CN | 210041546 | U | 2/2020 |
| JP | H0866272 | A | 3/1996 |

* cited by examiner

MEDICAL BED HORIZONTAL DRIVING MECHANISM AND MEDICAL BED HORIZONTAL DRIVING SYSTEM, AND MEDICAL BED

CROSS-REFERENCE TO RELATED APPLICATIONS

The present application is a U.S. National Stage Entry of PCT application no. PCT/CN2020/079247, filed on Mar. 13, 2020, the contents of which are incorporated herein by reference in its entirety.

TECHNICAL FIELD

The present disclosure relates to a driving mechanism and, in particular, to a medical bed horizontal driving mechanism, a medical bed horizontal driving system including the same, and a medical bed.

BACKGROUND

When examining or treating a patient, it is often necessary to place the patient on a medical bed and send the patient into an examination or treatment instrument, such as a computed tomography detection apparatus. For convenience of use, the medical bed usually includes a bed frame and a bed board which are movable relative to each other, wherein the bed board is used to carry the patient. At present, a driving mechanism for driving the movement of the bed board occupies a large space, has many transition parts, is complicated to assemble, takes a long time to debug, and is not easy to install and maintain.

SUMMARY

An objective of the present disclosure is to provide a medical bed horizontal driving mechanism, which is easy to install and maintain.

Another objective of the present disclosure is to provide a medical bed horizontal driving system, which is easy to install and maintain.

Still another objective of the present disclosure is to provide a medical bed having a medical bed horizontal driving mechanism, which is easy to install and maintain.

The present disclosure provides a medical bed horizontal driving mechanism, including a bracket, a drum, an electric motor, and a position sensor. The bracket is configured to be fixedly connected to a bed frame of a medical bed. The drum is rotatably connected to the bracket. The drum is rotatable to drive the bed board of the medical bed to move relative to the bed frame. The electric motor is arranged in a cavity of the drum. A housing of the electric motor is fixedly connected to the bracket. An output shaft of the electric motor is connected to the drum to drive the drum to rotate relative to the bracket. The position sensor is arranged in the cavity of the drum. The position sensor is capable of detecting a rotational position of the drum and generating a position signal, which is used to control the electric motor.

The bracket, the drum, the electric motor, and the position sensor of the medical bed horizontal driving mechanism are of an integrated structure, and assembly and disassembly of the integrated structure can be achieved through assembly and disassembly of the bracket and the bed frame, thereby facilitating installation and maintenance. Furthermore, the integrated structure contributes to saving space.

In another exemplary embodiment of the medical bed horizontal driving mechanism, the medical bed horizontal driving mechanism further includes a speed sensor arranged in the cavity of the drum. The speed sensor is capable of detecting a rotational speed of the output shaft of the electric motor and generating a rotational speed signal, which is used to control the electric motor. In this way, it is beneficial to improve the driving accuracy of the medical bed horizontal driving mechanism.

In still another exemplary embodiment of the medical bed horizontal driving mechanism, the bracket includes a pair of support assemblies. Each support assembly includes a connector and a support shaft. The connector is configured to be fixedly connected to the bed frame. The support shaft is fixedly connected to the connector, and has an axis overlapping with the rotation axis of the drum. The support shaft is connected to one axial end of the drum, so as to support the rotation of the drum. The bracket has a simple structure, is easy to manufacture, and has a good stability.

In yet another exemplary embodiment of the medical bed horizontal driving mechanism, the support shaft is of a hollow shaft structure, and has a hollow through hole configured for passage of lead wires of the electric motor and the position sensor. In this way, the structure is more compact.

In a further exemplary embodiment of the medical bed horizontal driving mechanism, the drum is in the shape of a round tube. The medical bed horizontal driving mechanism further includes two end covers, which are fixedly connected to the two axial ends of the drum, so as to close openings at the two ends of the drum. The support shafts included in the pair of support assemblies respectively pass through the two end covers to support the rotation of the drum. In this way, it is beneficial to protect the internal structure of the drum from water and dust.

In another further exemplary embodiment of the medical bed horizontal driving mechanism, the medical bed horizontal driving mechanism further includes a speed reducer arranged in the cavity of the drum. The electric motor is connected to the drum via the speed reducer to drive the drum to rotate. In this way, the torque can be increased.

In still another further exemplary embodiment of the medical bed horizontal driving mechanism, the medical bed horizontal driving mechanism further includes a support sleeve. The support sleeve is arranged in the cavity of the drum and is arranged parallel to the drum. One end of the support sleeve is fixedly connected to the bracket. The electric motor is arranged in a cavity of the support sleeve, and the housing of the electric motor is fixedly connected to the support sleeve. The speed reducer is arranged in the cavity of the support sleeve, and an output shaft of the speed reducer rotatably passes through the other end of the support sleeve. The end of the output shaft of the speed reducer that passes out of the support sleeve is fixedly connected to the drum. The support sleeve has a simple structure, is easy to manufacture, and has a good stability.

In yet another further exemplary embodiment of the medical bed horizontal driving mechanism, the medical bed horizontal driving mechanism further includes two connection flanges and a brake. The two connection flanges are arranged in the cavity of the support sleeve and are respectively located on two axial sides of the electric motor. The two connection flanges are fixedly connected to the support sleeve. Two axial ends of the output shaft of the electric motor respectively rotatably pass through the two connection flanges. The brake is arranged in the cavity of the support sleeve. The two ends of the output shaft of the electric motor that pass out of the two connection flanges are respectively connected to the speed reducer and the brake. The stability of the output shaft of the electric motor during use can be improved by means of the connection flanges.

In a yet further exemplary embodiment of the medical bed horizontal driving mechanism, the medical bed horizontal driving mechanism further includes a tension pulley and a drive belt. The tension pulley is rotatably arranged on the bed frame, and has a rotation axis parallel to the rotation axis of the drum. The drive belt is wound around the tension pulley and the drum. Two ends of the drive belt are configured to be fixedly connected to the bed board. The drum is rotatable to drive the drive belt to move, so as to drive the bed board to move linearly. A position of the tension pulley relative to the bed frame is adjustable in a movement direction of the bed board, so as to tension the drive belt. The structure is easy to assemble and has a good stability.

In a yet another exemplary embodiment of the medical bed horizontal driving mechanism, the medical bed horizontal driving mechanism further includes a horizontal movement component and two fixing assemblies. The horizontal movement component is configured to be fixedly connected to the bed board. Each fixing assembly includes a first toothed plate and a second toothed plate. The first toothed plate is fixedly connected to the horizontal movement component. The second toothed plate is detachably connected to the first toothed plate and engageable with the first toothed plate, so as to prevent the first toothed plate and the second toothed plate from moving relative to each other in the movement direction of the bed board. The first toothed plate and the second toothed plate that are engaged with each other are capable of clamping and fixing one end of the drive belt by means of engaged teeth. The two fixing assemblies respectively clamp and fix two ends of the drive belt. The structure is easy to assemble and has a good firmness.

The present disclosure also provides a medical bed horizontal driving system, which includes the medical bed horizontal driving mechanism described above, and a controller. The controller can control the electric motor according to the position signal. The medical bed horizontal driving system is convenient for installation and maintenance, and saves space.

The present disclosure also provides a medical bed, which includes a bed frame, a bed board, and the medical bed horizontal driving system described above. The bed board is movably arranged on the bed frame. The bracket is fixedly connected to the bed frame. The drum is rotatable to drive the bed board to move relative to the bed frame. The medical bed horizontal driving system is convenient for installation and maintenance, and saves space.

BRIEF DESCRIPTION OF THE DRAWINGS

The following accompanying drawings merely illustratively describe and explain the present disclosure and do not limit the scope of the present disclosure.

DESCRIPTION OF REFERENCE NUMERALS

Figure 1:
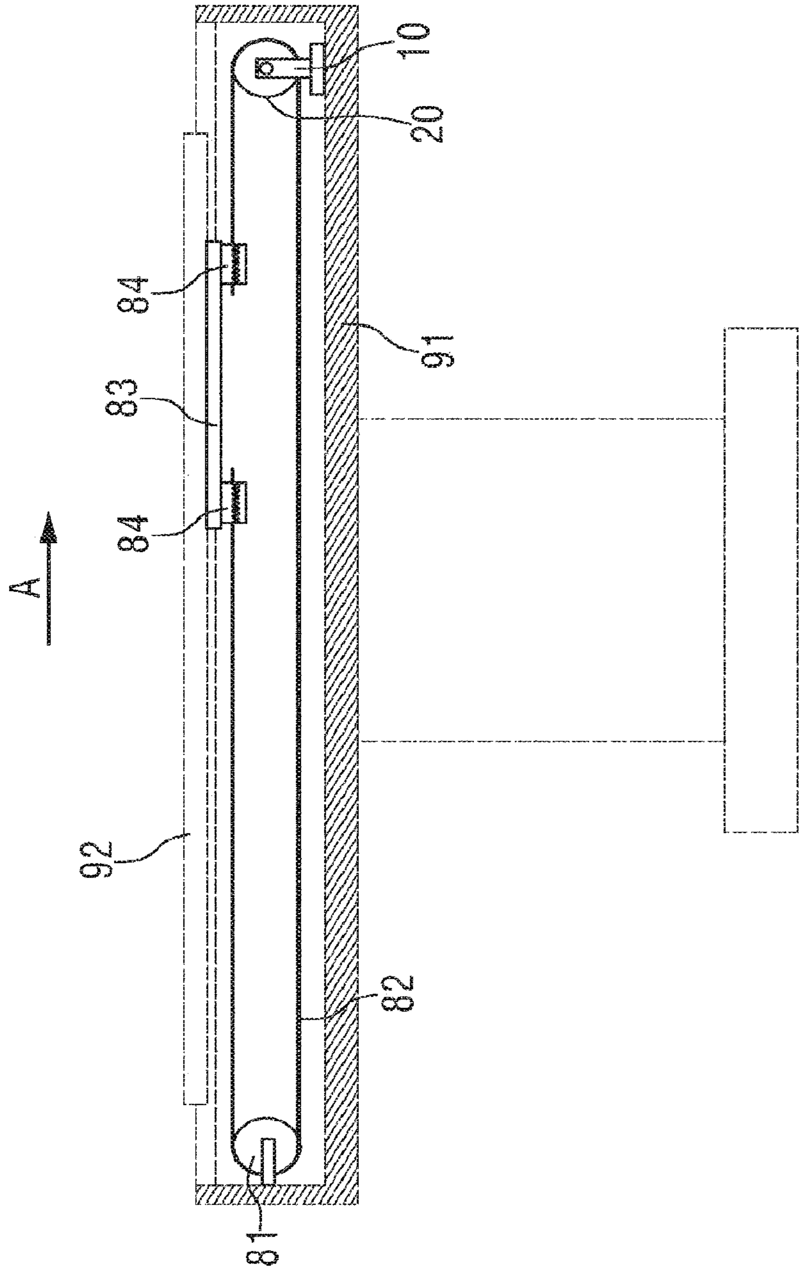
FIG. 1 is a schematic structural diagram of an exemplary embodiment of a medical bed horizontal driving mechanism.

10 Bracket
11 Support assembly
12 Connector
13 Support shaft
20 Drum
22 End cover
30 Electric motor
31 Output shaft of the electric motor
41 Position sensor
42 Speed sensor
50 Speed reducer
52 Output shaft of the speed reducer
61 Support sleeve
62 Connection flange
63 Drum body connection seat
70 Brake
81 Tension pulley
82 Drive belt
83 Horizontal movement component
84 Fixing assembly
841 First toothed plate
842 Second toothed plate
91 Bed frame
92 Bed board
A Direction.

DETAILED DESCRIPTION OF THE DISCLOSURE

For a clearer understanding of the technical features, objectives, and effects of the present disclosure, the specific embodiments of the present disclosure will now be described with reference to the accompanying drawings, in which the same reference sign denotes components having the same or similar structure and the same function.

The word "exemplary" represents "serving as an instance, example, or description" herein, and any illustration and implementation described as "exemplary" herein should not be interpreted as a more preferred or more advantageous technical solution.

Herein, "first", "second", etc. do not indicate their degree of importance or order, but are only used to indicate differences from each other, to facilitate description of the disclosure.

For the sake of brevity of the drawings, only the parts relevant to the present disclosure are exemplarily shown in the figures, and they do not represent the actual structure as a product.

FIG. 1 is a schematic structural diagram of an exemplary embodiment of a medical bed horizontal driving mechanism. As shown in FIG. 1, the medical bed includes a bed frame 91, a bed board 92, and a medical bed horizontal driving mechanism (the part indicated by the solid line in the figure). The bed board 92 is movably arranged on the bed frame 91 along a direction A and its opposite direction.

As shown in FIG. 1, the medical bed horizontal driving mechanism includes a bracket 10, a drum 20, a tension pulley 81, a drive belt 82, a horizontal movement component 83, and two fixing assemblies 84. Furthermore, the medical bed horizontal driving mechanism is provided with an electric motor 30 and a position sensor 41 in a cavity of the drum 20. The horizontal movement component 83 is also called a trailer.

As shown in FIG. 1, the bracket 10 is configured to be fixedly connected to the bed frame 91 of the medical bed.

The drum 20 is rotatably connected to the bracket 10. The drum 20 can rotate to drive the bed board 92 of the medical bed to move relative to the bed frame 91.

Figure 2:
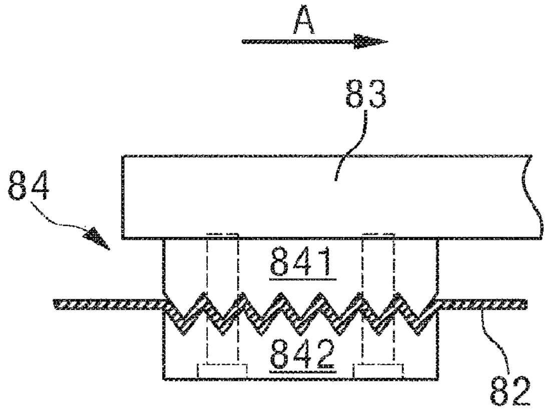
FIG. 2 is a partial schematic structural diagram of the medical bed horizontal driving mechanism shown in FIG. 1.

Specifically, in this exemplary embodiment, the drum 20 drives the bed board 92 to move by means of the following structure. The tension pulley 81 is rotatably arranged on the bed frame 91, and has a rotation axis parallel to a rotation axis of the drum 20. The drive belt 82 is wound around the tension pulley 81 and the drum 20. The drive belt 82 is, for example, a timing belt, a flat belt, or a wedge belt, and the tension pulley 81 and the drum 20 have a drive structure matching the drive belt. The horizontal movement component 83 is configured to be fixedly connected to the bed board 92. FIG. 2 is a partial schematic structural diagram of the medical bed horizontal driving mechanism shown in FIG. 1. Each fixing assembly 84 includes a first toothed plate 841 and a second toothed plate 842, as shown in FIG. 2. The first toothed plate 841 is fixedly connected to the horizontal movement component 83. The second toothed plate 842 is detachably connected to the first toothed plate 841 via bolts and can be engaged with the first toothed plate 841 to prevent the first toothed plate 841 and the second toothed plate 842 from moving relative to each other in a movement direction of the bed board 92. The first toothed plate 841 and the second toothed plate 842 that are engaged with each other can clamp and fix one end of the drive belt 82 by means of engaged teeth. The two fixing assemblies 84 respectively clamp and fix two ends of the drive belt 82. In this way, the drum 20 can rotate to drive the drive belt 82 to move, so as to drive the bed board 92 to move in the direction A and its opposite direction. However, it is not limited to this. In other exemplary embodiments, the drum 20 may also drive the bed board 92 to move in other ways. For example, a gear structure provided on the drum 20 and a rack structure provided on the bed board 92 are used to achieve direct driving.

In this exemplary embodiment, the position of the tension pulley 81 relative to the bed frame 91 can be adjusted in the movement direction of the bed board 92 to tension the drive belt 82. The adjustment is performed by, for example, bolts. Specifically, a shaft of the tension pulley 81 is fixed to the bed frame 91 via a bolt, and the position of the tension pulley 81 relative to the bed frame 91 can be adjusted by rotating the bolt. However, it is not limited to this. In other exemplary embodiments, the position of the tension pulley 81 relative to the bed frame 91 may be set to be fixed.

In this exemplary embodiment, the drive belt 82 can be fixed to the bed board 92 via the horizontal movement component 83 and the fixing assemblies 84. However, it is not limited to this. In other exemplary embodiments, the drive belt 82 may also be configured to be directly connected to the bed board 92.

In this exemplary embodiment, the horizontal movement component 83 can be movably connected to the bed frame 91 in the direction A and its opposite direction, and the connection is, for example, a sliding connection or a connection by means of rollers. The horizontal movement component 83 is configured to be fixed to the bed board 92, so as to drive the bed board 92 to move relative to the bed frame 91. However, it is not limited to this. In other exemplary embodiments, it is possible that the bed board 92 may also be directly movably connected to the bed frame 91.

Figure 3:
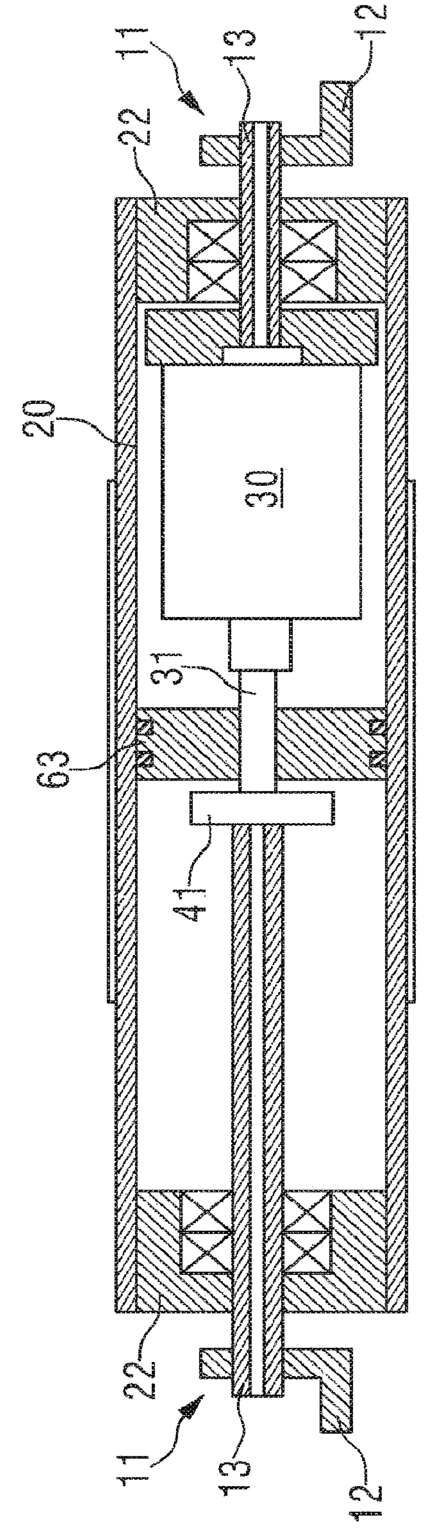
FIG. 3 is a partial cross-sectional view of the medical bed horizontal driving mechanism shown in FIG. 1.

FIG. 3 is a partial cross-sectional view of the medical bed horizontal driving mechanism shown in FIG. 1. As shown in FIG. 3, the bracket 10 includes a pair of support assemblies 11. Each support assembly 11 includes a connector 12 and a support shaft 13. The connector 12 is configured to be fixedly connected to the bed frame 91. The support shaft 13 is fixedly connected to the connector 12, and has an axis overlapping with the rotation axis of the drum 20. The two support shafts 13 are connected to two axial ends of the drum 20 in one-to-one correspondence, so as to support the rotation of the drum 20. The bracket 10 has a simple structure, is easy to manufacture, and has a good stability, but is not limited thereto.

The electric motor 30 is arranged in the cavity of the drum 20. A housing of the electric motor 30 is fixedly connected to one of the support shafts 13. An output shaft 31 of the electric motor 30 is connected to the drum 20 via a drum body connection seat 63 to drive the drum 20 to rotate relative to the bracket 10. The position sensor 41 is arranged in the cavity of the drum 20. The position sensor 41 can detect a rotational position of the drum 20 and generate a position signal. The position signal is used to control the electric motor 30 to improve the driving accuracy of the medical bed horizontal driving mechanism. The position sensor 41 is, for example, an encoder.

In the medical bed horizontal driving mechanism of this exemplary embodiment, the bracket 10, the drum 20, the electric motor 30, and the position sensor 41 are of an integrated structure, and assembly and disassembly of the integrated structure can be achieved through assembly and disassembly of the bracket 10 and the bed frame 91, thereby facilitating installation and maintenance. Furthermore, the integrated structure contributes to saving space.

In an exemplary embodiment, the support shaft 13 is of a hollow shaft structure, and has a hollow through hole configured for passage of lead wires of the electric motor 30 and the position sensor 41, thereby making the structure more compact.

In an exemplary embodiment, the drum 20 is in the shape of a round tube. The medical bed horizontal driving mechanism further includes two end covers 22, which are fixedly connected to the two axial ends of the drum 20, so as to close openings at the two ends of the drum 20. The support shafts 13 included in the pair of support assemblies 11 respectively pass through the two end covers 22 to support the rotation of the drum 20. In this way, it is beneficial to protect the internal structure of the drum 20 from water and dust.

Figure 4:
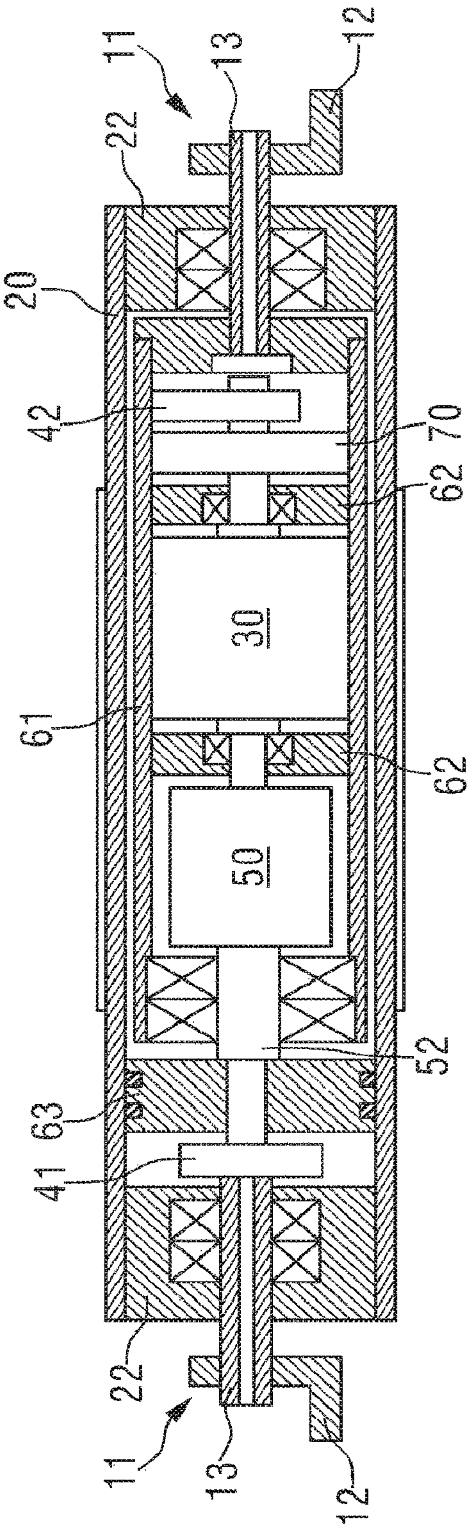
FIG. 4 is a partial cross-sectional view of another exemplary embodiment of a medical bed horizontal driving mechanism.

FIG. 4 is a partial cross-sectional view of another exemplary embodiment of a medical bed horizontal driving mechanism. The same or similar parts between the medical bed horizontal driving mechanism of this exemplary embodiment and the medical bed horizontal driving mechanism shown in FIG. 1 will not be repeated here, and the differences therebetween will be described below.

In this exemplary embodiment, the medical bed horizontal driving mechanism further includes a support sleeve 61, two connection flanges 62, a speed reducer 50, a brake 70, and a speed sensor 42.

The support sleeve 61 is arranged in the cavity of the drum 20 and is arranged parallel to the drum 20. One end of the support sleeve 61 is fixedly connected to one of the support shafts 13. The electric motor 30 is arranged in a cavity of the support sleeve 61. The housing of the electric motor 30 is fixedly connected to the support sleeve 61. The two connection flanges 62 are arranged in the cavity of the support sleeve 61 and are respectively located on two axial sides of the electric motor 30. The two connection flanges 62 are fixedly connected to the support sleeve 61. Two axial ends of the output shaft of the electric motor 30 rotatably pass through the two connection flanges 62 respectively, thereby improving the stability of the output shaft of the electric motor 30 during use.

The speed reducer 50 and the brake 70 are arranged in the cavity of the support sleeve 61. The speed reducer 50 is, for example, a planetary speed reducer or a harmonic speed reducer. The two ends of the output shaft of the electric motor 30 that pass out of the two connection flanges 62 are respectively connected to an input shaft of the speed reducer 50 and the brake 70. An output shaft 52 of the speed reducer 50 rotatably passes through the end of the support sleeve 61 that is not connected to the support shaft 13, thereby improving the stability of the output shaft 52 of the speed reducer 50 during use. The end of the output shaft 52 of the speed reducer 50 that passes out of the support sleeve 61 is fixedly connected to the drum 20 via the drum body connection seat 63. The electric motor 30 is connected to the drum 20 via the speed reducer 50 to drive the drum 20 to rotate, thereby increasing a torque.

The speed sensor 42 is arranged in the cavity of the support sleeve 61. The speed sensor 42 can detect a rotational speed of the output shaft of the electric motor 30 and generate a rotational speed signal, and the rotational speed signal is used to control the electric motor 30 to improve the driving accuracy of the medical bed horizontal driving mechanism. The speed sensor 42 is composed of, for example, an encoder or a resolver and a Hall sensor.

In the medical bed horizontal driving mechanism of this exemplary embodiment, the bracket 10, the drum 20, the electric motor 30, the position sensor 41, the support sleeve 61, the connection flanges 62, the speed reducer 50, the brake 70, and the speed sensor 42 are of an integrated structure, and assembly and disassembly of the integrated structure can be achieved through assembly and disassembly of the bracket 10 and the bed frame 91, thereby facilitating installation and maintenance. Furthermore, the integrated structure contributes to saving space.

In this exemplary embodiment, the fixing of the electric motor 30, the speed reducer 50 and the brake 70 is realized by the support sleeve 61, so that the structure is simple, is easy to process, and has a good stability, but is not limited thereto.

In this exemplary embodiment, the two ends of the output shaft of the electric motor 30 are connected to the speed reducer 50 and the brake 70, respectively. This arrangement enables both the speed reducer 50 and the brake 70 to be located closer to the electric motor 30 compared to being mounted at the same end, facilitating improving the driving and braking effects.

The present disclosure also provides a medical bed horizontal driving system, which includes a medical bed horizontal driving mechanism shown in FIG. 1 and a controller in an exemplary embodiment. The controller can control the electric motor 30 according to the position signal. In the medical bed horizontal driving mechanism of the medical bed horizontal driving system, the bracket 10, the drum 20, the electric motor 30, and the position sensor 41 are of an integrated structure, and assembly and disassembly of the integrated structure can be achieved through assembly and disassembly of the bracket 10 and the bed frame 91, thereby facilitating installation and maintenance. Furthermore, the integrated structure contributes to saving space.

In another exemplary embodiment, the medical bed horizontal driving system includes a medical bed horizontal driving mechanism shown in FIG. 4 and a controller. The controller can control the electric motor 30 according to the position signal and the rotational speed signal. In the medical bed horizontal driving mechanism of the medical bed horizontal driving system, the bracket 10, the drum 20, the electric motor 30, the position sensor 41, the support sleeve 61, the connection flanges 62, the speed reducer 50, the brake 70, and the speed sensor 42 are of an integrated structure, and assembly and disassembly of the integrated structure can be achieved through assembly and disassembly of the bracket 10 and the bed frame 91, thereby facilitating installation and maintenance. Furthermore, the integrated structure contributes to saving space.

The medical bed described above may be used in medical systems such as magnetic resonance and electronic computed tomography, for example.

The present disclosure also provides a medical bed. In an exemplary embodiment, the medical bed includes a bed frame 91, a bed board 92, and a medical bed horizontal driving system described above. The bed board 92 is movably arranged on the bed frame 91. The bracket 10 is fixedly connected to the bed frame 91. The drum 20 can rotate to drive the bed board 92 to move relative to the bed frame 91. The medical bed horizontal driving system is convenient for installation and maintenance, and saves space.

It should be understood that, although the specification is described according to various embodiments, not each of the embodiments contains only one independent technical solution. This description of the specification is merely for the sake of clarity. Those skilled in the art should consider the specification as a whole, and the technical solutions in the various embodiments can also be combined as appropriate to form other embodiments that can be understood by those skilled in the art.

The series of detailed descriptions set forth above are merely specific illustrations of feasible embodiments of the present disclosure, and are not intended to limit the protection scope of the present disclosure. Equivalent implementations or variations without departing from the technical spirit of the present disclosure, such as combinations, divisions, or repetitions of the features, should fall within the protection scope of the present disclosure.

The invention claimed is:

1. A medical bed horizontal driving mechanism, comprising:

a bracket configured to be fixedly connected to a bed frame of a medical bed;

a drum rotatably connected to the bracket, the drum being rotatable to drive a bed board of the medical bed to move the bed board relative to the bed frame;

an electric motor arranged in a cavity of the drum, wherein a housing of the electric motor is fixedly connected to the bracket, and an output shaft of the electric motor is connected to the drum to drive the drum to rotate relative to the bracket; and a position sensor arranged in the cavity of the drum, the position sensor being configured to detect a rotational position of the drum and to generate a position signal that is used to control the electric motor.

2. The medical bed horizontal driving mechanism of claim 1, further comprising:

a speed sensor arranged in the cavity of the drum, wherein the speed sensor is configured to detect a rotational speed of the output shaft of the electric motor and to generate a rotational speed signal that is used to control the electric motor.

3. The medical bed horizontal driving mechanism of claim 1, wherein the bracket comprises a pair of support assemblies, each one of the support assemblies comprising:

a connector configured to be fixedly connected to the bed frame; and a support shaft fixedly connected to the connector and having an axis overlapping with a rotation axis of the drum, wherein the support shaft is connected to one axial end of the drum so as to support the rotation of the drum.

4. The medical bed horizontal driving mechanism of claim 3, wherein the support shaft of each one of the support assemblies has a hollow shaft structure and a hollow through hole configured for passage of lead wires of the electric motor and the position sensor.

5. The medical bed horizontal driving mechanism of claim 3, further comprising:

two end covers, each one of the two end covers being fixedly connected to a respective on of two axial ends of the drum so as to close openings at the two axial ends of the drum, wherein the respective support shafts comprised in each one of the pair of support assemblies respectively passes through a respective one of the two end covers to support the rotation of the drum, and wherein the drum comprises a round tube.

6. The medical bed horizontal driving mechanism of claim 1, further comprising:

a speed reducer arranged in the cavity of the drum, wherein the electric motor is connected to the drum via the speed reducer to drive the drum to rotate.

7. The medical bed horizontal driving mechanism of claim 6, further comprising:

a support sleeve, wherein:

the support sleeve is arranged in the cavity of the drum parallel to the drum, one end of the support sleeve is fixedly connected to the bracket, the electric motor is arranged in a cavity of the support sleeve, and the housing of the electric motor is fixedly connected to the support sleeve, the speed reducer is arranged in the cavity of the support sleeve, an output shaft of the speed reducer rotatably passes through the other end of the support sleeve, and the end of the output shaft of the speed reducer that passes out of the support sleeve is fixedly connected to the drum.

8. The medical bed horizontal driving mechanism of claim 7, comprising:

two connection flanges arranged in the cavity of the support sleeve, each one of the two connection flanges being respectively located on one of two axial sides of the electric motor, the two connection flanges being fixedly connected to the support sleeve, and two axial ends of the output shaft of the electric motor, respectively, rotatably pass through each of the two connection flanges; and a brake arranged in the cavity of the support sleeve, wherein each one of the two ends of the output shaft of the electric motor that pass out of the two connection flanges are connected, respectively, to the speed reducer and to the brake.

9. The medical bed horizontal driving mechanism of claim 1, further comprising:

a tension pulley rotatably arranged on the bed frame and having a rotation axis parallel to the rotation axis of the drum; and a drive belt wound around the tension pulley and the drum, wherein:

each respective one of two ends of the drive belt is configured to be fixedly connected to the bed board, the drum is rotatable to drive the drive belt to move so as to drive the bed board to move linearly, and a position of the tension pulley relative to the bed frame is adjustable in a movement direction of the bed board so as to tension the drive belt.

10. The medical bed horizontal driving mechanism of claim 9, further comprising:

a horizontal movement component configured to be fixedly connected to the bed board; and two fixing assemblies, each respective one of the fixing assemblies comprising:

a first toothed plate fixedly connected to the horizontal movement component; and a second toothed plate detachably connected to the first toothed plate and engageable with the first toothed plate so as to prevent the first toothed plate and the second toothed plate from moving relative to each other in the movement direction of the bed board, wherein the first toothed plate and the second toothed plate are cofigured to clamp and fix one end of the drive belt via engaged teeth, and wherein the two fixing assemblies respectively clamp and fix two ends of the drive belt.

11. A medical bed horizontal driving system, comprising:

a medical bed horizontal driving mechanism comprising:

a bracket configured to be fixedly connected to a bed frame of a medical bed;

a drum rotably connected to the bracket, the drum being rotatable to drive a bed board of the medical bed to move the bed board relative to the bed frame;

an electric motor arranged in a cavity pf the drum, wherein a housing of the electric motor is fixedly connected to the bracket, and an output shaft of the electric motor is connected to the drive drum to rotate relative to the bracket; and a position sensor arranged in the cavity of the drum, the position sensor being configured to detect a rotational position of the drum and to generate a position signal that is used to control the electric motor; and a controller configured to control the electric motor according to the position signal.

12. A medical bed, comprising:

a bed frame;

a bed board movably arranged on the bed frame; and a medical bed horizontal driving system comprising, a medical bed horizontal driving mechanism comprising:

a bracket configured to be fixedly connected to a bed frame;

a drum rotably connected to the bracket, the drum being rotatable to drive a bed board to move the bed board relative to the bed frame;

an electric motor arranged in a cavity pf the drum, wherein a housing of the electric motor is fixedly connected to the bracket, and an output shaft of the electric motor is connected to the drum to drive the drum to rotate relative to the bracket; and a position sensor arranged in the cavity of the drum, the position sensor being configured to detect a rotational position of the drum and to generate a position signal that is used to control the electric motor; and a controller configured to control the electric motor according to the position signal.

* * * * *